Dec. 26, 1944.    P. F. SPERRY    2,366,153
FILM MAGAZINE EJECTING MECHANISM
Original Filed Nov. 3, 1941
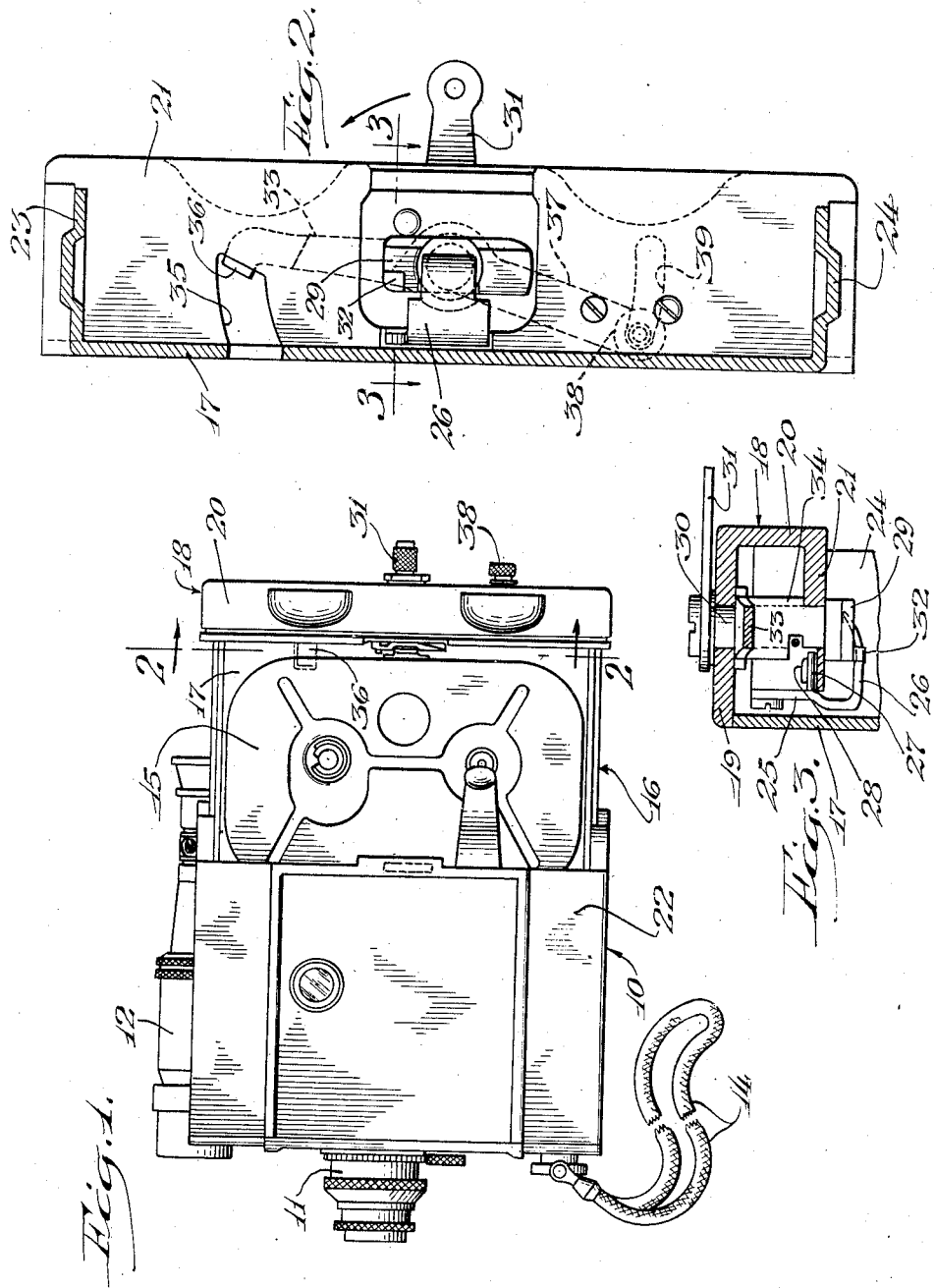

Patented Dec. 26, 1944

2,366,153

UNITED STATES PATENT OFFICE 2,366,153

FILM MAGAZINE EJECTING MECHANISM

Philmore F. Sperry, deceased, late of Chicago, Ill., by Helen B. Sperry, executrix, Chicago, Ill., assignor, by mesne assignments, to Theodore H. Briskin, Philip F. Briskin, and Jack Briskin Original application November 3, 1941, Serial No. 417,648. Divided and this application November 23, 1942, Serial No. 466,597

4 Claims. (Cl. 88—17)

This application is being filed as a division of the co-pending application of Philmore F. Sperry, Serial No. 417,648, filed November 3, 1941. The invention relates to motion picture cameras of the type in which a film is mounted in the camera in a lightproof magazine, having a shutter closing an exposure opening at the front face of the magazine, such magazine being supported in the camera chamber by means of a carrier which is movable forwardly and backwardly in the chamber. In this type of construction, the magazine is inserted into the carrier so as to be gripped fairly tightly, and means is provided for pressing the magazine into the desired operative position with respect to the lens system of the camera.

It is the principal object of this invention to provide an improved arrangement of means for releasing the magazine from the grip of the carrier when the magazine is to be removed from the camera. In the preferred arrangement, an ejector member is movably mounted on the carrier in position for engagement with the side face of a magazine in the carrier so as to apply pressure transversely on the magazine for pressing it out of the grip of the carrier. In this preferred arrangement, the ejector member is in the form of a lever pivotally mounted on a heavy shaft forming a part of the means for holding the magazine normally pressed forwardly to the limit of its motion on the carrier, such lever being provided with operating means accessible from the outside of the camera casing for actuating the lever.

It is another object of the invention to improve devices of this type in sundry details hereinafter pointed out. The preferred means by which the several objects have been attained are illustrated in the accompanying drawing, in which—

Fig. 1 is a side face view of a camera provided with the improved construction, showing the carrier for the magazine in its rearmost position with respect to the camera casing;

Fig. 2 is a vertical cross sectional view taken on a substantially increased scale at the line 2—2 of Fig. 1; and Fig. 3 is a horizontal sectional view taken substantially at the line 3—3 of Fig. 2.

In the drawing, 10 indicates the camera casing, having a lens system 11 mounted at its front face portion for the exposure of the film which is given a step by step movement past the lens system by means of mechanism of any approved type. A suitable view finder 12 is mounted on the casing in convenient position thereon. A carrying loop 14 is shown in Fig. 1.

In the arrangement illustrated, a film magazine 15 of any approved type is inserted at one side face of a carrier 16 in the form of a drawer slidable forwardly and backwardly in the casing 10. In the construction shown, the carrier comprises a side wall portion 17 and a rear edge bar member 18 comprising a rear wall portion 19, a side wall portion 20, and a front wall portion 21. When the carrier is moved forwardly to the limit of its motion, the bar member 18 has tight engagement with the rear edge face of a side plate portion 22 of the casing. In the arrangement shown, the top and bottom wall portions 23 and 24 of the carrier are formed integrally with the side wall portion 17.

Means is provided on the carrier for pressing the magazine 15 forwardly thereon, comprising an arm 25 pivotally mounted on a transverse axis within the small chamber provided by the bar member 18, such arm 25 being provided at its upper end with a head portion 26 extending crosswise in front of the wall portion 21. A lug 27 on the arm 25 is pressed forwardly by a flat spring 28 mounted in engagement with the rear face of the lug. Immediately to the rear of the head member 26, a cross head 29 is movably mounted, being supported by a heavy shaft 30 rotatably mounted in the wall portions 19 and 21. At its rear end portion, the shaft 30 is provided with a handle or lever 31 which is accessible at the outside of the casing of the camera for actuating the shaft 30.

When the magazine 15 is inserted into the carrier 16, the rear face of the magazine engages the head portion 26 of the lever 25 so as to cause the spring 28 to be effective for pressing the magazine forwardly. After the magazine has been inserted and the carrier 16 has been moved forwardly to its operative position in the casing, the lever 31 is swung for moving the cross head 29 from its vertical position as shown in Fig. 2 to its operative horizontal position in which it locks the arm 25 against rearward movement, the cross head 29 being provided with a lug 32 on its front face adapted by camming engagement with the rear face of the head portion 26 to press the arm 25 forwardly by a positive action.

The means for releasing the magazine 15 from the grip of the carrier 16 when the magazine is to be removed from the camera comprises an arm 33 movably mounted on the carrier and having a portion in position to engage the side face of the magazine. In the improved construction, the arm 33 is rigidly mounted on the top face of a sleeve 34 rotatably mounted on the heavy shaft 30, such arm 33 being bent at its upper end portion so as to extend forwardly through an arc-shaped slot 35 in the wall portion 21 and being provided with a head portion 36 adapted to engage the side face of the magazine 15. At its lower face, the sleeve 34 is provided with an arm 37 having at its lower end a handle 38 on the outer face of the wall portion 19, the wall portion 19 being provided with a suitable slot 39 for accommodating this arrangement. The lever comprising the arms 33 and 37 is shown in Fig. 2 in its magazine ejecting position with the head 36 swung to the right from its normal position in the plane of the wall 17. When the carrier 16 has been retracted to its rearmost position, the lever is given a swinging movement in clockwise direction into the position shown in Fig. 2 for applying pressure sidewise on the face of the magazine 15 for pressing the magazine out of the grip of the carrier.

While the arrangement as shown and described is preferred, the invention is not to be limited thereto except so far as the claims may be so limited, it being understood that changes might well be made in the arrangement without departing from the spirit of the invention.

What is claimed is:

1. In a mechanism of the type described, the combination of a casing providing a magazine chamber, a carrier in the form of a drawer movable forwardly and backwardly in said chamber for moving a film magazine mounted in the carrier into and out of operative position in said chamber, spring-pressed means mounted on the rear wall portion of the drawer for pressing a film magazine forwardly in the drawer, cam means mounted on the rear wall portion of the drawer for holding the film magazine positively against backward movement with respect to the drawer, and means movably mounted on said rear wall portion of said carrier adapted by an operative stroke sidewise when the carrier is in about its rearmost position to give a film magazine in said carrier a preliminary movement out of position in the carrier.

2. In a mechanism of the type described, the combination of a casing providing a magazine chamber, a carrier in the form of a housing into which a film magazine is adapted to be inserted at one side face so as to be gripped by the housing and movable forwardly and backwardly in the chamber for carrying the film magazine into and out of operative position in the chamber, a shaft rotatably mounted on a horizontal axis at the rear edge portion of said carrier so as to extend forwardly toward the position of the magazine in the carrier, a sleeve rotatably mounted on said shaft, an arm mounted on said sleeve so as to swing transversely of the carrier for applying sidewise pressure on a portion of a magazine in the carrier, and means comprising a handle extending to the exterior of the magazine chamber for giving said arm a swinging movement for releasing the film magazine from the grip of the carrier.

3. In a mechanism of the type described, the combination of a casing providing a magazine chamber, a carrier in the form of a housing into which a film magazine is adapted to be inserted at one side face so as to be gripped by the housing and movable forwardly and backwardly in the chamber for carrying the film magazine into and out of operative position in the chamber, a shaft rotatably mounted on a horizontal axis at the rear edge portion of said carrier so as to extend forwardly toward the position of the magazine in the carrier, a sleeve rotatably mounted on said shaft, an arm extending upwardly from said sleeve so as to swing transversely of the carrier for applying sidewise pressure on the rear edge portion of a magazine in the carrier, an arm extending downwardly from said sleeve, and a handle member connected with said second arm at its lower end and extending through the wall of the carrier for giving said first-named arm an operative stroke for releasing the magazine from the grip of the carrier.

4. In a mechanism of the type described, the combination of a casing providing a magazine chamber, a carrier in the form of a housing into which a film magazine is adapted to be inserted at one side face so as to be gripped by the housing and movable forwardly and backwardly in the chamber for carrying the film magazine into and out of operative position in the chamber, a spring-pressed member adapted normally to move a magazine forwardly to the limit of its motion with respect to said carrier, a shaft rotatably mounted on a horizontal axis at the rear edge portion of said carrier so as to extend forwardly toward the position of the magazine in the carrier, a cross head mounted on said shaft adapted in its operative position to lock said spring-pressed member positively in its forwardly moved position, a sleeve rotatably mounted on said shaft, a lever mounted on said sleeve with a portion positioned opposite to said magazine so as to apply sidewise pressure to the magazine upon an operative stroke, and operating means connected with said lever and accessible outside of the casing for giving said lever an operative stroke for releasing the magazine from the grip of the carrier.

HELEN B. SPERRY,
*Executrix of the Estate of Philmore F. Sperry, Deceased.*